US012543998B2

(12) United States Patent
Cantwell et al.

(10) Patent No.: US 12,543,998 B2
(45) Date of Patent: Feb. 10, 2026

(54) CONDUCTIVE INSTRUMENT

(71) Applicant: Medtronic Xomed, Inc., Jacksonville, FL (US)

(72) Inventors: Matthew L. Cantwell, Orange Park, FL (US); John R. Prisco, St. Johns, FL (US); Matthias Bissinger, Teningen (DE); Benedikt Florian, Teningen (DE)

(73) Assignee: Medtronic Xomed, Inc., Jacksonville, FL (US)

( * ) Notice: Subject to any disclaimer, the term of this patent is extended or adjusted under 35 U.S.C. 154(b) by 1129 days.

(21) Appl. No.: 17/152,848

(22) Filed: Jan. 20, 2021

(65) Prior Publication Data

US 2021/0251556 A1 Aug. 19, 2021

Related U.S. Application Data

(60) Provisional application No. 62/965,424, filed on Jan. 24, 2020.

(51) Int. Cl.

| | |
|---|---|
| *A61B 5/388* | (2021.01) |
| *A61B 5/00* | (2006.01) |
| *A61B 5/294* | (2021.01) |
| *A61B 5/311* | (2021.01) |
| *A61B 17/28* | (2006.01) |
| *A61B 5/0538* | (2021.01) |
| *A61B 17/00* | (2006.01) |

(52) U.S. Cl.
CPC .............. *A61B 5/388* (2021.01); *A61B 5/294* (2021.01); *A61B 5/311* (2021.01); *A61B 5/6847* (2013.01); *A61B 17/2816* (2013.01); *A61B 17/282* (2013.01); *A61B 17/2841* (2013.01); *A61B 5/0538* (2013.01); *A61B 2017/00026* (2013.01); *A61B 2017/00929* (2013.01); *A61B 17/28* (2013.01); *A61B 2017/2845* (2013.01); *A61B 2505/05* (2013.01)

(58) Field of Classification Search
None
See application file for complete search history.

(56) References Cited

U.S. PATENT DOCUMENTS

| | | | |
|---|---|---|---|
| 4,265,237 A | 5/1981 | Schwanbom et al. | |
| 5,026,370 A | 6/1991 | Lottick | |
| 5,116,332 A | 5/1992 | Lottick | |

(Continued)

FOREIGN PATENT DOCUMENTS

| | | | |
|---|---|---|---|
| EP | 0745355 A1 | 12/1996 | |
| EP | 1587418 A1 | 10/2005 | |

(Continued)

OTHER PUBLICATIONS

English Translation of EP 0 745 355 (Year: 1996).*
(Continued)

*Primary Examiner* — Jacqueline Cheng
*Assistant Examiner* — Jairo H Portillo
(74) *Attorney, Agent, or Firm* — Carter, DeLuca & Farrell LLP

(57) ABSTRACT

Disclosed is an instrument assembly for a selected procedure. The procedure may include a dissection and neural monitoring. The instrument may be insulated to allow for a selected and precise electrical conductive path.

13 Claims, 11 Drawing Sheets

(56) References Cited

U.S. PATENT DOCUMENTS

| | | |
|---|---|---|
| 5,350,356 A * | 9/1994 | Bales .................... A61M 3/022 604/27 |
| 7,236,822 B2 | 6/2007 | Dobak, III |
| 7,496,407 B2 | 2/2009 | Odderson |
| 7,689,292 B2 | 3/2010 | Hadzic et al. |
| 7,789,833 B2 | 9/2010 | Urbano et al. |
| 7,987,001 B2 | 7/2011 | Teichman et al. |
| 7,993,269 B2 | 8/2011 | Donofrio et al. |
| 8,068,910 B2 | 11/2011 | Gerber et al. |
| 8,126,736 B2 | 2/2012 | Anderson et al. |
| 8,255,045 B2 | 8/2012 | Gharib et al. |
| 8,374,673 B2 | 2/2013 | Adcox et al. |
| 8,498,717 B2 | 7/2013 | Lee et al. |
| 8,515,520 B2 | 8/2013 | Brunnett et al. |
| 8,568,312 B2 | 10/2013 | Cusimano Reaston et al. |
| 8,568,317 B1 | 10/2013 | Gharib et al. |
| 8,594,779 B2 | 11/2013 | Denison et al. |
| 8,670,830 B2 | 3/2014 | Carlson et al. |
| 8,680,986 B2 | 3/2014 | Costantino |
| 8,688,237 B2 | 4/2014 | Stanislaus et al. |
| 8,805,527 B2 | 8/2014 | Mumford et al. |
| 8,886,280 B2 | 11/2014 | Kartush |
| 8,892,259 B2 | 11/2014 | Bartol et al. |
| 8,926,509 B2 | 1/2015 | Magar et al. |
| 8,956,418 B2 | 2/2015 | Wasielewski et al. |
| 8,989,855 B2 | 3/2015 | Murphy et al. |
| 9,031,658 B2 | 5/2015 | Chiao et al. |
| 9,078,671 B2 | 7/2015 | Beale et al. |
| 9,084,550 B1 | 7/2015 | Bartol et al. |
| 9,084,551 B2 | 7/2015 | Brunnett et al. |
| 9,204,830 B2 | 12/2015 | Zand et al. |
| 10,039,915 B2 | 8/2018 | McFarlin et al. |
| 2003/0171747 A1 | 9/2003 | Kanehira et al. |
| 2004/0135528 A1 | 7/2004 | Yasohara et al. |
| 2005/0075067 A1 | 4/2005 | Lawson et al. |
| 2005/0149143 A1 | 7/2005 | Libbus et al. |
| 2005/0159659 A1 | 7/2005 | Sawan et al. |
| 2005/0215993 A1 | 9/2005 | Phan |
| 2006/0079931 A1* | 4/2006 | Brennan .............. A61B 17/062 606/205 |
| 2006/0241725 A1 | 10/2006 | Libbus et al. |
| 2006/0276702 A1 | 12/2006 | McGinnis |
| 2007/0270918 A1 | 11/2007 | De Bel et al. |
| 2007/0282217 A1 | 12/2007 | McGinnis et al. |
| 2008/0077198 A1 | 3/2008 | Webb et al. |
| 2008/0183915 A1 | 7/2008 | Iima |
| 2008/0214903 A1 | 9/2008 | Orbach |
| 2008/0218393 A1 | 9/2008 | Kuramochi et al. |
| 2008/0300650 A1 | 12/2008 | Gerber et al. |
| 2008/0306348 A1 | 12/2008 | Kuo et al. |
| 2009/0182322 A1 | 7/2009 | D'Amelio et al. |
| 2009/0240117 A1 | 9/2009 | Chmiel et al. |
| 2009/0299439 A1 | 12/2009 | Mire et al. |
| 2010/0036280 A1 | 2/2010 | Ballegaard et al. |
| 2010/0042100 A1* | 2/2010 | Tetzlaff .............. A61B 18/1445 606/51 |
| 2010/0152811 A1 | 6/2010 | Flaherty |
| 2010/0152812 A1 | 6/2010 | Flaherty et al. |
| 2010/0160731 A1 | 6/2010 | Giovannini et al. |
| 2010/0168561 A1 | 7/2010 | Anderson |
| 2010/0191311 A1 | 7/2010 | Scheiner et al. |
| 2011/0028860 A1 | 2/2011 | Chenaux et al. |
| 2011/0071418 A1 | 3/2011 | Stellar et al. |
| 2011/0160731 A1 | 6/2011 | Bleich et al. |
| 2011/0230734 A1 | 9/2011 | Fain et al. |
| 2011/0245647 A1 | 10/2011 | Stanislaus et al. |
| 2011/0270120 A1 | 11/2011 | McFarlin et al. |
| 2011/0270121 A1 | 11/2011 | Johnson et al. |
| 2012/0004516 A1 | 1/2012 | Eng et al. |
| 2012/0071784 A1 | 3/2012 | Melkent et al. |
| 2012/0130269 A1 | 5/2012 | Rea |
| 2012/0245439 A1 | 9/2012 | Andre et al. |
| 2013/0030257 A1 | 1/2013 | Nakata et al. |
| 2013/0090641 A1 | 4/2013 | McKinney et al. |
| 2013/0245722 A1 | 9/2013 | Ternes et al. |
| 2013/0261422 A1 | 10/2013 | Gilmore et al. |
| 2014/0058284 A1 | 2/2014 | Bartol et al. |
| 2014/0073985 A1 | 3/2014 | Sakai et al. |
| 2014/0074084 A1 | 3/2014 | Engeberg et al. |
| 2014/0275914 A1 | 9/2014 | Li et al. |
| 2014/0303452 A1 | 10/2014 | Ghaffari |
| 2015/0012066 A1 | 1/2015 | Underwood |
| 2015/0088029 A1 | 3/2015 | Wybo |
| 2015/0112325 A1 | 4/2015 | Whitman |
| 2015/0202395 A1 | 7/2015 | Fromentin |
| 2015/0238260 A1 | 8/2015 | Nau, Jr. |
| 2015/0250423 A1 | 9/2015 | Hacker et al. |
| 2016/0015299 A1 | 1/2016 | Chan et al. |
| 2016/0038072 A1 | 2/2016 | Brown et al. |
| 2016/0038073 A1 | 2/2016 | Brown et al. |
| 2016/0038074 A1 | 2/2016 | Brown et al. |
| 2016/0199659 A1 | 7/2016 | Jiang et al. |
| 2016/0235999 A1 | 8/2016 | Nuta et al. |
| 2016/0262699 A1 | 9/2016 | Goldstone et al. |
| 2016/0270679 A1 | 9/2016 | Mahon et al. |
| 2016/0287112 A1 | 10/2016 | Mcfarlin et al. |
| 2016/0287861 A1 | 10/2016 | Mcfarlin et al. |
| 2016/0317053 A1 | 11/2016 | Srivastava |
| 2017/0020601 A1 | 1/2017 | Thomson et al. |
| 2017/0312006 A1 | 11/2017 | McFarlin et al. |
| 2018/0345004 A1 | 12/2018 | Mcfarlin et al. |
| 2019/0261875 A1 | 8/2019 | Cantwell et al. |

FOREIGN PATENT DOCUMENTS

| | | | |
|---|---|---|---|
| GB | 2452158 A | 2/2009 | |
| JP | 2004/503266 A | 2/2004 | |
| JP | 2008/519609 A | 6/2008 | |
| JP | 2012/516205 A | 7/2012 | |
| JP | 2014/117328 A | 6/2014 | |
| WO | 99/37359 A1 | 7/1999 | |
| WO | 01/78831 A2 | 10/2001 | |
| WO | 02/082982 A1 | 10/2002 | |
| WO | 2004064632 A1 | 8/2004 | |
| WO | 2006/026482 A2 | 3/2006 | |
| WO | 2010/090835 A1 | 8/2010 | |
| WO | 2011/150502 A2 | 12/2011 | |
| WO | 2013/019757 A2 | 2/2013 | |
| WO | 2013/151770 A1 | 10/2013 | |
| WO | 2015-069962 A1 | 5/2015 | |
| WO | WO-2017008142 A1 * | 1/2017 | .......... A61B 18/1445 |
| WO | WO-2017034844 A1 * | 3/2017 | ....... A61B 17/00234 |
| WO | WO-2018204858 A1 * | 11/2018 | ............... A61B 5/24 |
| WO | WO-2019028588 A1 * | 2/2019 | .......... A61B 18/1442 |

OTHER PUBLICATIONS

Australian Examination Report mailed Dec. 8, 2018 in corresponding/related Australian Application No. 2016244152.
Australian Office Action mailed Feb. 8, 2018 in corresponding/related Australian Application No. 2015301110.
Canadian Office Action mailed Dec. 11, 2017 in corresponding/related Canadian Application No. 2,957,385.
Cypress Perform. SPI-based CyFi™ Transceiver Data Sheet. Cypress Semiconductor Corporation. (Jun. 25, 2009) pp. 1-45.
Hurley "Physiotherapy for Sleep Disturbance in Chronic Low Pack Pain: a Feasibility Randomised Controlled Trial" BMC Musculoskeletal Disorders; 11 pages; 2010.
International Preliminary Report on Patentability mailed Oct. 12, 2017 in corresponding International Application No. PCT/US2016/023903.
International Preliminary Report on Patentability mailed Oct. 12, 2017 in corresponding/related International Application No. PCT/US2016/023910.
International Search Report and Written Opinion for PCT/US2015/043844 mailied Jan. 12, 2016.
International Search Report and Written Opinion for PCT/US2016/023903 dated Sep. 19, 2016 which claims benefit of U.S. Appl. No. 14/678,485, filed Apr. 3, 2015.
International Search Report and Written Opinion for PCT/US2016/023910 dated Aug. 5, 2016 which claims benefit of U.S. Appl. No. 14/578,452, filed Apr. 3, 2015.

(56) References Cited

OTHER PUBLICATIONS

International Search Report and Written Opinion mailed Nov. 29, 2017 in corresponding International Application No. PCT/US2017/051825.
Invitation to Pay Additional Fees mailed Jun. 10, 2016 for International Application No. PCT/US2016/023903 which corresponds to U.S. Appl. No. 14/678,485, filed Apr. 3, 2015.
Japanese Office Action mailed Mar. 22, 2018 in corresponding/related Australian Application No. 2017-506854.
Our intraoperative neuromonitoring tools add value to your surgical procedures, Neurovision Medical Products, 2019.
Wustrack "Change in Physical Activity One Year after Lumbar Decompression with or without Fusion, is it Correlated to Self-Reported Outcome Scores?" Proceedings of NASS 20th Annual Meeting/The Spine Journal 5 (2005) IS-189S.
Wustrack "Physical Activity does not correlate with HRQL Scores in Patients with Degeneratie Lumbar Conditions" Proceedings of the NASS 20th Annual Meeting/The Spine Journal 5 (2005) IS-189S.
International Search Report and Written Opinion regarding International Application No. PCT/US2021/014270, mailed Apr. 22, 2021.
International Preliminary Report on Patentability regarding PCT/US2021/014270, dated Aug. 4, 2022.
European Office Action dated Nov. 21, 2024, 5pp.

\* cited by examiner

CONDUCTIVE INSTRUMENT

CROSS-REFERENCE TO RELATED APPLICATIONS

This application claims the benefit of U.S. Provisional Application No. 62/965,424, filed on Jan. 24, 2020. The entire disclosure of the above application is incorporated herein by reference.

FIELD

The subject disclosure relates to instrumentation, and particularly to an insulated conductive hinged instrument.

BACKGROUND

This section provides background information related to the present disclosure which is not necessarily prior art.

A system to perform a procedure on a subject may include a neural monitoring or testing system. Generally, the neural monitoring or testing system may include a stimulating portion and a sensing portion. In particular, a first instrument or set of instruments may be used to provide stimulation to one or more areas of a subject. A monitoring portion may be positioned away from the stimulation instrument and may receive a signal if a connection is maintained between the stimulation portion and the receiving or sensing portion. Accordingly, a stimulating portion or member may be provided to be positioned in a selected portion of the subject as to simulate a portion of the subject.

In a monitoring system, it may be desirable to include stimulation at a small area or point. Thus, an instrument may be provided that includes a small tip or portion that is conductive. To maintain the small tip, however, insulation on all other conductive portions is needed. The insulation may wear and need be replaced or renewed when placed on instruments that are formed for general purpose procedures.

SUMMARY

This section provides a general summary of the disclosure, and is not a comprehensive disclosure of its full scope or all of its features.

Disclosed is a system including an instrument operable to provide a stimulation in a selected position (e.g. point or small volume) during a selected procedure. The instrument may further be operable to assist in dissection, gripping, moving, etc. of a select area for performing a procedure. The instrument may be a part of an electrical stimulation system to assist in performing a procedure.

The instrument may include a forceps instrument. The forceps instrument may have a handle portion configured to be grasped and held by a user. The handle portion may extend to a hinge region allowing two portions of the handle to move relative to one another, such as toward and away from each other. Extending from the hinge region is a tip or dissecting region. The tip region may also open and close, such as two members moving toward and away from each other, in concert with the handled region.

The forceps has an electrical connection near the handle region to a stimulation source. A stimulation signal may be provided through the forceps to the tip region substantially at a distal end of the forceps instrument. Further the forceps instrument may be insulated between the handle region and a tip region so that the stimulation signal is delivered substantially, including only, at the distal end or region of the instrument to a subject.

According to various embodiments, a system for monopolar nerve monitoring, is disclosed. The system may include a first handle member having a first side and a second side extending from a first end to a second end; a second handle member having a third side and a fourth side extending from a third end to a fourth end; a single signal connection formed with the first handle member; a hinge region defined by the first side of the first handle member positioned near and facing the third side of the second handle member, wherein the opposite second sides and fourth sides are exposed and facing away from the hinge region and each other; a hinge assembly extending between the first handle member and the second handle member in the hinge region; and an electrically insulating material coating the first handle member and the second handle member from the first end and third end to the respective second end and fourth end. The hinge assembly may include an elongated member positioned in a first bore of the first handle member in the hinge region and a second bore in the second handle member in the hinge region, wherein the elongated member is configured to allow movement of the first handle member relative to the second handle member, a first washer in electrical contact with the elongated member and at least one of the first handle member and the second handle member, and a biasing member extending from the first washer and biased against the elongated member. The hinge mechanism forms an electrical connection between the single connection and both the second end and the fourth end such that a first distal tip at the second end and a second distal tip at the fourth end are both electrically connected to the single signal connection.

According to various embodiments, a system for monopolar nerve monitoring is disclosed. The nerve monitoring system may include a first handle member having a first side and a second side extending from a first end to a second end; a second handle member having a third side and a fourth side extending from a third end to a fourth end; a single connection formed with the first handle member; a hinge region defined by the first side of the first handle member positioned near third side of the second handle member; and a hinge mechanism extending between the first handle member and the second handle member. The second side of the first handle member and the fourth side of the second handle member are substantially exposed relative to the hinge region and the hinge mechanism forms an electrical connection between the single connection and both the second end and the fourth end.

According to various embodiments, a method of monopolar nerve monitoring with a hinged instrument having a first handle member and a second handle member is disclosed. The method may include providing a first handle member having an electrically insulating coating extending from a first end toward a second end, wherein a first tip at the second end is exposed; providing a second handle member having an electrically insulating coating extending from a third end toward a fourth end, wherein a second tip at the fourth end is exposed; providing a single electrical connection at the first end or the third end; and forming an electrical path between the first handle member and the second handle member at a hinge region between the first handle member and the second handle member.

It is understood that the disclosure may relate to a living subject, such as a human, but that the disclosed system and method is not limited thereto. For example, the instrument may be used for providing a stimulation to any appropriate selected subject or system such as a non-living subject or an inanimate system.

In various embodiments, a system for monopolar nerve monitoring in procedures may include a first handle member having a first side and a second side extending from a first end to a second end; a second handle member having a third side and a fourth side extending from a third end to a fourth end; a single connection formed with the first handle member; a hinge region defined between the first handle member and the second handle member; an electrically insulating material coating the first handle member and the second handle member; wherein the hinge assembly forms an electrical connection between the single connection and both the first end of the first handle member and the third end of the second handle member such that a first distal tip at the first end and a second distal tip at the third end are both electrically connected to the single signal connection. In various embodiments, the first handle member and the second handle member include an external dimension such that a smooth transition is formed from an exterior surface of the coating to the respective first distal tip and second distal tip.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
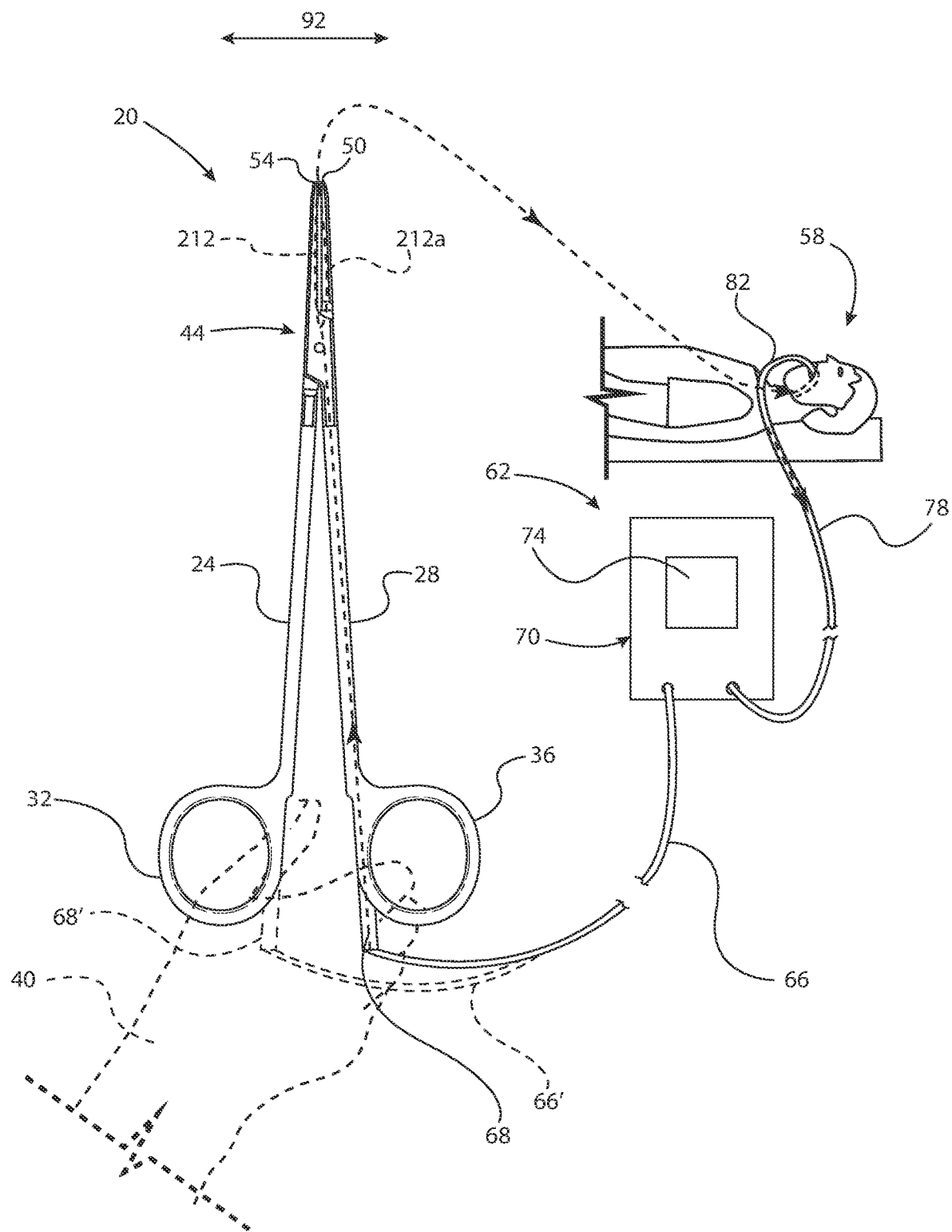
FIG. 1 is a schematic illustration of an instrument assembly in an operation location.
Figure 2:
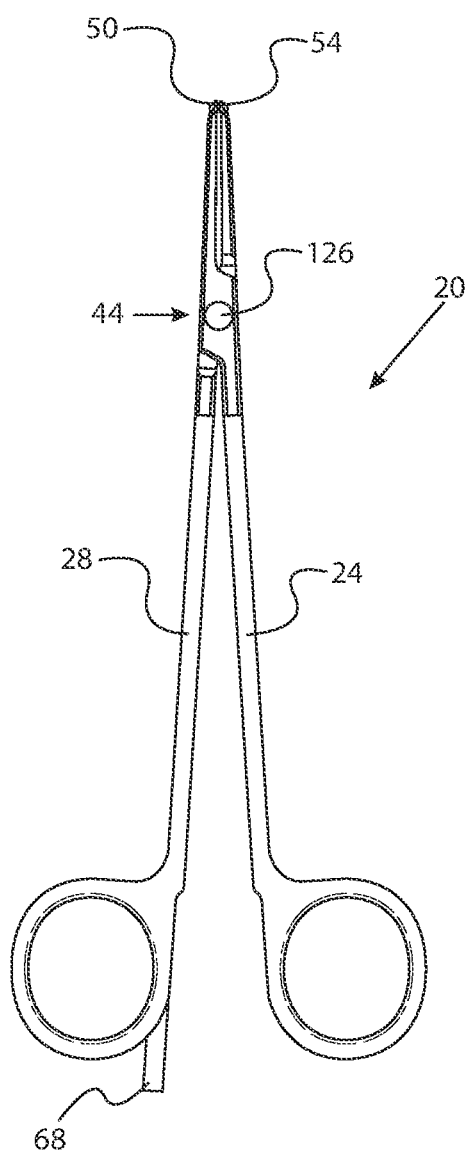
FIG. 2 is a plan view of an instrument assembly of FIG. 1.
Figure 3:
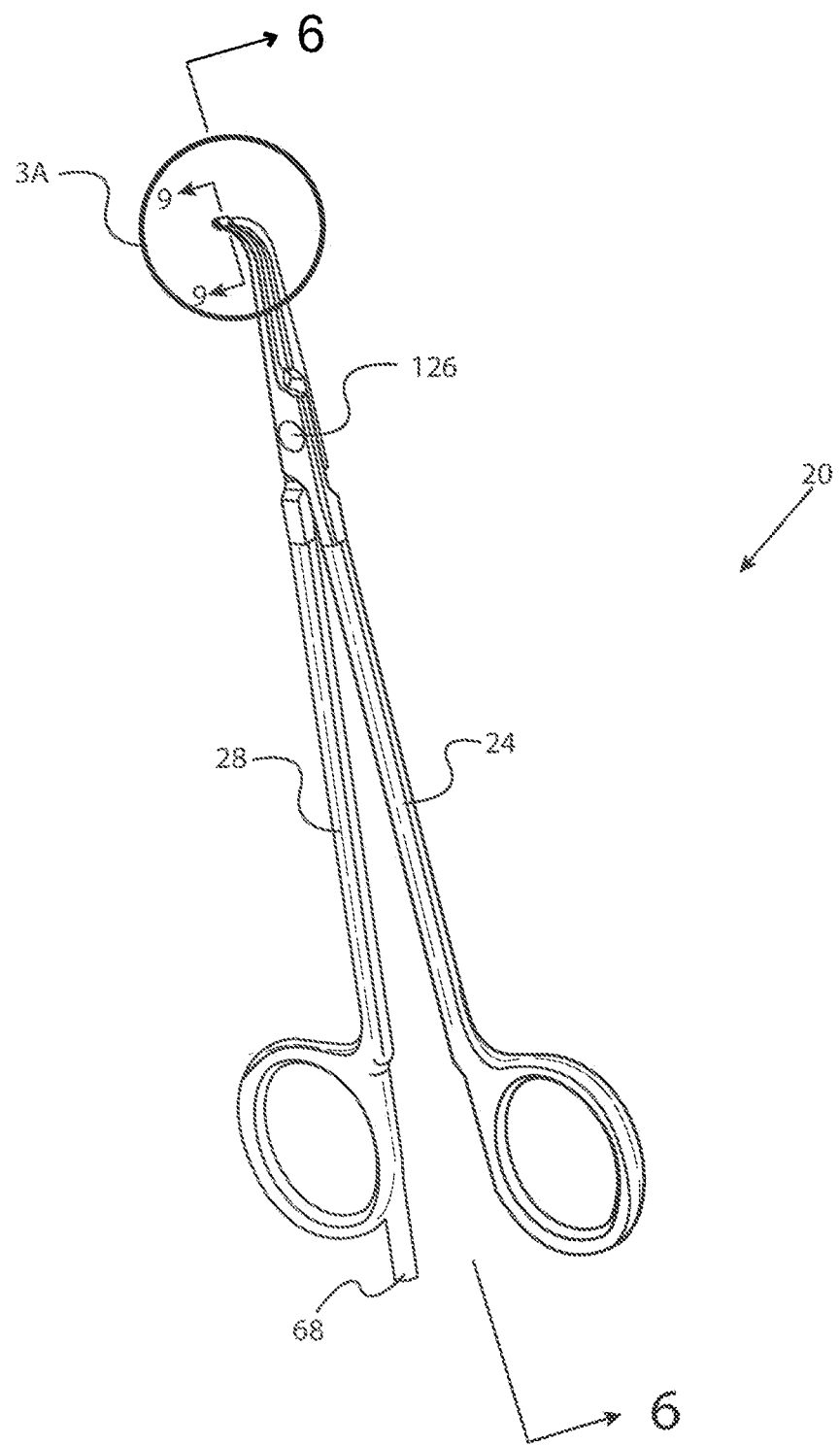
FIG. 3 is a perspective view of the instrument assembly of FIG. 2.

With initial reference to FIG. 1, FIG. 2, and FIG. 3, a hinged instrument 20 is illustrated. The instrument 20 may be any appropriate instrument, such as a forceps or dissecting instrument that may include a first handle portion 24 and a second handle portion 28. The handle portions 24, 28 may extend from graspable portions or regions at respective first ends, such as a first graspable portion 32 and a second graspable portion 36. The graspable portions 32, 34 may be formed as finger loops at a proximal end of the instrument 20 may be grasped by a hand of a user 40. In various embodiments, for example, the graspable portions 32, 36 may be grasped by a single hand of the user 40.

The user 40 may manipulate or move the respective handles 24, 28 via a hinge region 44 to move respective distal or manipulating portions or tips 50, 54. The tips 50, 54 are generally distal ends and include distal terminal ends of the instrument 20. In various embodiments, the instrument 20 may be a dissecting forceps and the distal ends 50, 54 may be used to move, dissect, cut, manipulate or otherwise affect tissue or selected portions of a subject 58.

As schematically illustrated in FIG. 1, the instrument 20 may be connected to a selected system such as a nerve monitoring system 62. In various embodiments, for example, the nerve monitoring system 62 may include portions similar to the NIM® nerve monitoring systems including the NIM-Response® 3.0 and NIM-Neuro® 3.0 nerve monitoring systems sold by Medtronic, Inc., having a place of business in Minneapolis, Minnesota. For example, a first lead or connection 66 may be connected to a connector or engagement portion 68 of the instrument 20. The cable 66 may extend to a monitoring box or processor system 70 that may include various outputs, such as a display screen 74.

Also connected to the monitoring system 70 may be a second lead or electrical connection 78 that may be connected or associated with the subject 58. The second connection 78 may provide a return to the monitoring system 70, such as via a tracheal tube sensor 82. The tracheal sensor or return 82 may include one or more electrodes that may sense an electrical signal that may be provided by or through the instrument 20 to the subject 58. The controller 70 may generate a signal that is transmitted through the instrument 20 into the subject 58 and the return path of the electrodes on the tracheal tube 82 may provide a feedback or return path to the controller 70. When the signal is received at the tracheal tube sensor 82 it is receiving a signal to indicate an integrity of a selected neural system of the subject 58. The output may be displayed on the display screen 74 for viewing by a selected individual or person, such as the user 40. It is understood, however, that the instrument 20 and the selected return path or system 82 may be associated with a non-living subject, and a human subject, such as the subject 58, is merely exemplary.

The instrument 20 may be monopolar or substantially monopolar. That is, the instrument 20, therefore, may have a single connection to the controller 70, such as via the connection 66 and transmit a signal from the controller 70 with no return path on the instrument 20. The distal ends 50, 54 may, therefore, transmit a single signal and the return path is through the sensor 82 or other appropriate ground. Thus, the instrument 20 does not, in a monopolar configuration, include both a signal transmission and return path through the instrument 20. It is understood, however, that the integrity system 62 may be operated in a substantially reverse manner such that a signal is transmitted through the tracheal system 82 and received at the instrument 20. As discussed herein, and illustrated in FIG. 1, a signal may initiate at the controller 70, transmitted through the instrument 20 and through the tips 50, 54 into the subject 58, and then returned to the controller 70 through the tube 82. In various embodiments, the only path may be this path and no return path is provided through the instrument 20 when a single is transmitted through the instrument 20 to the subject 58.

As discussed further herein, and only briefly here, the instrument 20 may, therefore, include a substantially electrically insulating material as a covering or insulation covering including or from the connector 68 to a position or portion that is substantially adjacent or in contact with the tips 50, 54. The instrument 20 may include a body or structure, such as of the handle portions 24, 28, that is conductive. In various embodiments, for example, the instrument 20 may be formed of a metal, metal alloy, conductive polymer, or the like. The instrument 20, including the handle portions 24, 28, therefore, may conduct a current or signal, such as an electrical signal, there through to and from the controller 70.

To ensure the polarity and/or the preciseness of the sensing or transmission of the signal (e.g. at the tips 50, 54) the instrument 20 may include the coating that extends from the connector 68 to a position substantially adjacent to the tips 50, 54. In various embodiments, for example, an insulation or coating stop or termination region 86 may be formed adjacent to the first tip 50 and a second termination region 88 may be formed adjacent to the second tip 54.

As discussed above, the instrument 20 includes the hinge region 44. The hinge region 44 allows for the tips 50, 54 to move relative to one another, such as generally in the direction of the double headed arrow 92. The movement of the tips 50, 54 is made possible due to movement of the grasping portions 32, 36 that are connected to the tips 50, 54 via the handle portions 24, 28. To ensure electrical connectivity between the controller 70 and the tips 50, 54, such as through the connector 68, the hinge assembly 44 may include a scissor configuration including hinge components 100.

With continuing reference to FIGS. 1-3, and additional reference to FIGS. 4-7, initially, the hinge region 44 includes the handle portions 24, 28. The handle portions 24, 28 each have two sides, such as at the hinge region 44. The first handle portion 24 may include a first side 24*i* and a second side 24*ii*. The second handle portion 28 may include a first side 28*i* and a second side 28*ii*. In the hinge region 44, generally, the respective second sides 24*ii*, 28*ii* face each other and the hinge region 44. Thus, when assembled, the first sides 24*i*, 28*i* face away from the hinge region 44 and are exposed relative to the hinge region 44.

Figure 4:
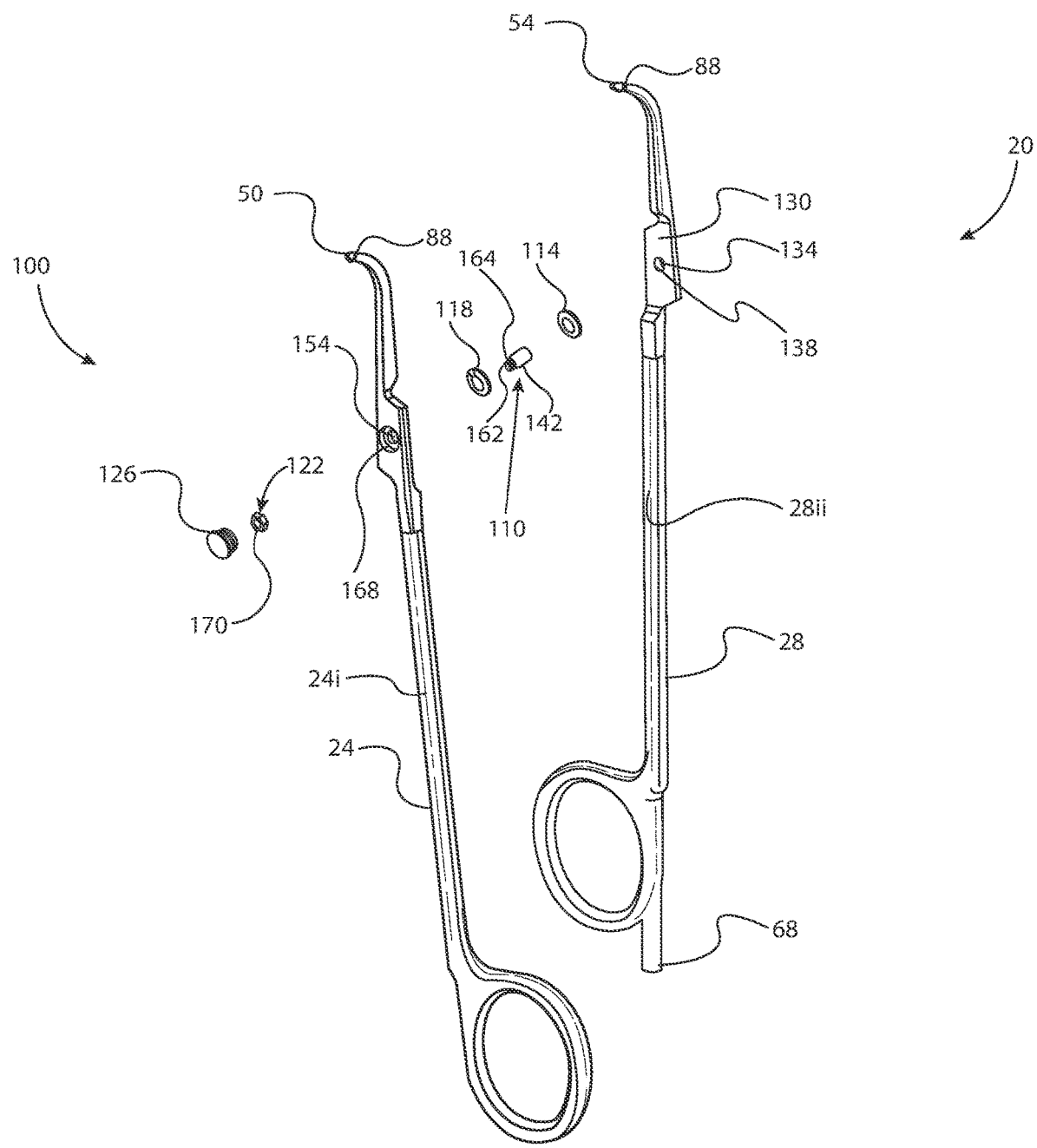
FIG. 4 is an exploded view of the instrument assembly of FIG. 2 from a first side.
Figure 5:
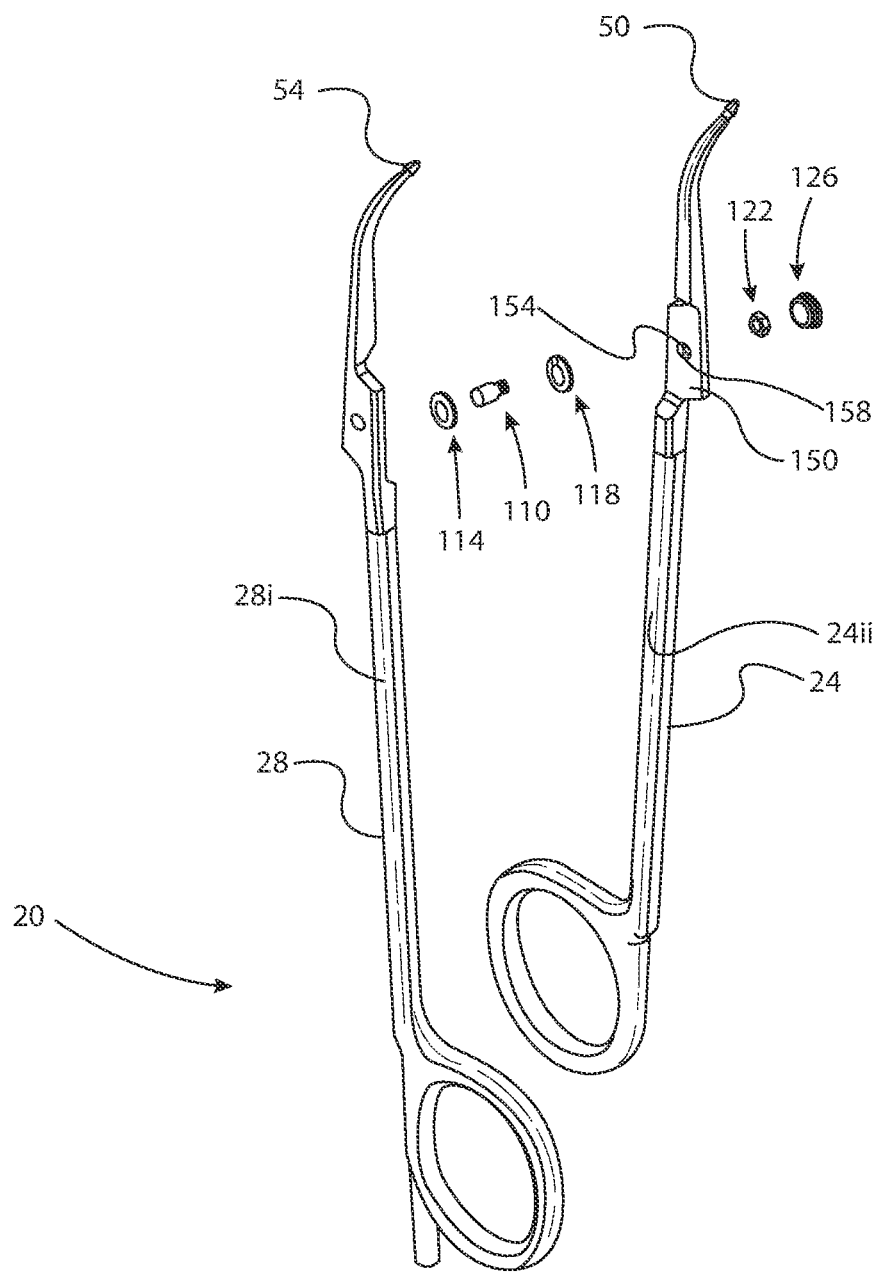
FIG. 5 is an exploded view of the instrument assembly of FIG. 2 from a second side.

The hinge assembly 100 may include a plurality of components that allow for stable and continuous electrical connection between the first handle 24 and the second handle 28. As illustrated in FIG. 4, the connector 68 is connected to the second handle 28. Accordingly, to maintain a monopolarity at the tips 50, 54 of the instrument 20 the two handles 24, 28 are electrically connected or common. The instrument 20, however, as discussed above, is generally insulatively coated, at least from the connector 68 to the wall or stop regions 86, 88. Therefore the hinge assembly 100 allows for electrical connectivity between the first handle 24 and the second handle 28. Generally, the hinge assembly 100 may include generally conductive components or portions including a bolt or elongated member 110, a first washer 114, a second washer 118, and a nut or fixation member 122. Various other components may also be provided such as a cover or insulated cap 126 that may cover the nut or fixation member 122.

Generally the second handle 28 may include an internal hinge surface 130 on the second side 28*ii* that may include an uncoated portion or region that is configured to mate with the first washer 114. The first washer 114 may be formed of a selected material that is substantially conductive, such as a material that is identical to material of the handle 28. It is understood, however, that the material of the washer 114 may be a different material than the handle 28 but may include electrically conductive property.

The bolt or pin 110 may be fixed to the second handle 28, such as within a bore 134. The bore 134 may include an internal diameter defined by an internal wall 138. The internal wall 138 may substantially mate or be fixed to an external wall 142 of the pin or bolt 110. In various embodiments, for example, the bolt 110 may be press fit into the bore 134 and/or otherwise fixed thereto, such as with an adhesive, welding, brazing, or the like.

In various embodiments, the second handle 28 may be coated with a selected material that is insulatively coated prior to assembling to the instrument 20. Accordingly, a portion of the hinge surface 130 may be masked during a coating procedure (e.g. dipping, spraying, deposition, etc.) and/or a portion may be removed during a further production process or step to allow for contact with the washer 114 and the bolt or pin 110. The bolt 110 may be fixed into the bore 134 in an appropriate manner even after a coating is positioned on the second handle 128.

The first handle 24 may also include a hinge contacting or facing surface 150 on the second side 24*ii*. Formed in or through the second handle 24 may be a bore or hole 154 that has an internal diameter or geometry defined by a wall 158. The second washer 118 may contact the surface 150. The second washer 118 may be formed of a material that is similar or identical to the first washer 114. Also, however, the second washer 118 may be formed of a different material than the first washer 114. Generally, however, the second washer 118 may generally be formed of a conductive material, such as an electrically conductive material, to allow for a conductivity through the hinge portion 100.

Further the bolt 110 may include a second end 162 that may extend through the bore 154. The bolt 110 may include an external thread 164 that may be exposed, such as with a depression or recess 168 and the handle portion 24. The nut 122 may include an internal bore 170 that may threadably engage the external threads 164 of the bolt 110. By engagement of the external threads 164 with the nut 122, the first handle 24 may be hingedly fixed to the second handle 28 when the pin 110 is fixed in the second handle 28. The cap 126 may be fit within the depression 168 to cover or insulate (e.g. electrically insulate) the nut 122 and the second end 162 of the pin or bolt 110.

Accordingly, after assembly of the hinge portion 100 to the respective handles 24, 28, the instrument 20 may be substantially externally insulated from the connector 68 to the tips 50, 54. A conductive path, however, such as an electrically conductive path, may be provided through the hinge assembly 100 between the two handles 24, 28. Thus, a signal, such as an electrical signal, may pass from the connector 68, through the handle 28, through the hinge assembly 100, including the bolt 110, to the second handle 24. In other words, the single signal may be transmitted through the instrument 20 from the tips 50, 54 to the connector 68 in a common or single path.

Figure 6:
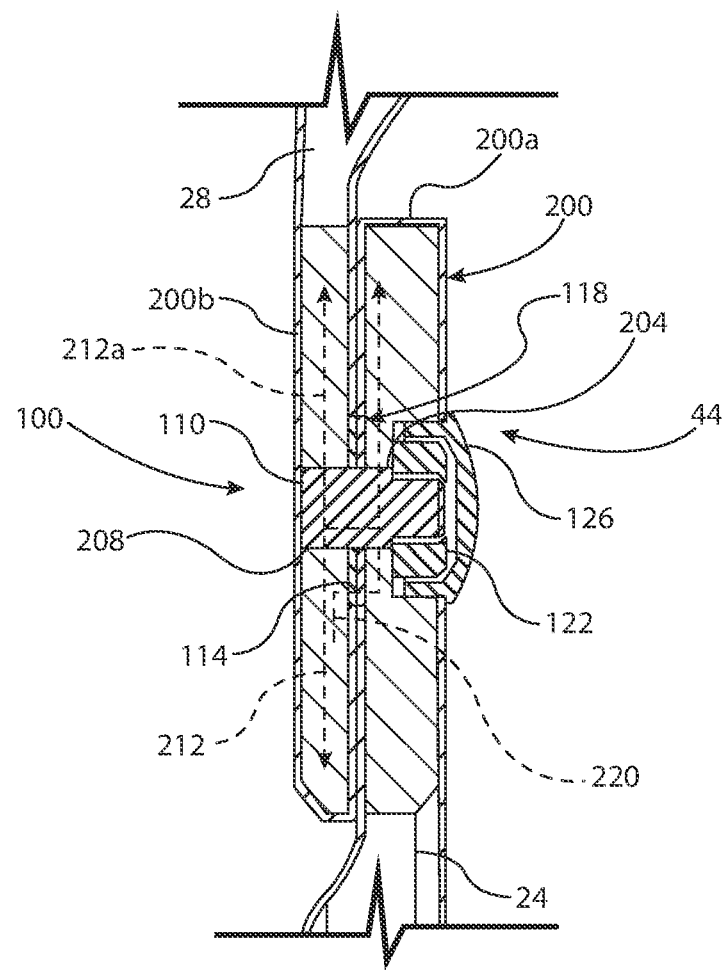
FIG. 6 is a detail cross-sectional view taken along lines 6-6 of FIG. 3, according to various embodiments.
Figure 7:
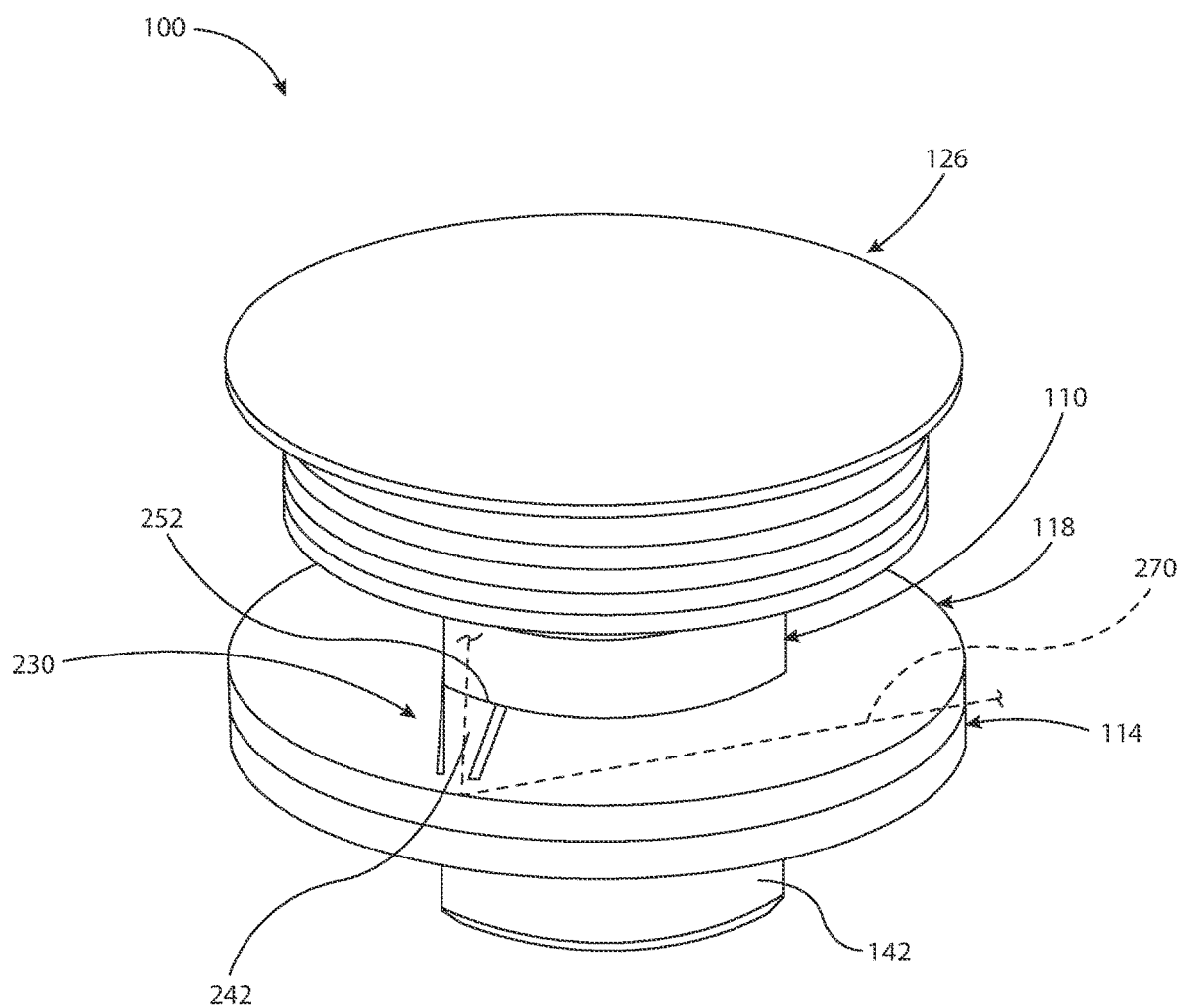
FIG. 7 is a detail view of a hinge assembly of the instrument of FIG. 2.

With continuing reference to FIGS. 1-7, and particular reference to FIGS. 1, 6, and 7, the hinge assembly 100 in the hinge region 100 may be used to ensure an electrical conductivity between the two handle portions 24, 28. With specific reference to FIG. 6, for example, the hinge assembly 100 may be formed of electrically conductive portions (e.g.

metal, metal alloy, etc.) that may provide an electrical/ conductive connection between the two handle portions 24, 28. With initial reference to FIG. 6, the handle portion may include an insulative, such as electrically insulative, coating layer 200 that may be formed thereon. As illustrated in FIG. 6 the insulative layer 200 may include a first insulative layer portion 200a on the first handle portion 24 and a second insulative layer portion or layer 200b on the second handle portion 28. The insulative layers may surround the conductive portions of the handles 24, 28 to allow for an electrical path between the connector 68 and the respective tips 50, 54. As illustrated in FIG. 6, however, the insulative layers 200a, 200b may be formed to entirely surround the respective handle portions 24, 28. Therefore, the handle portions 24, 28 may be substantially electrically isolated from one another.

The hinge assembly 100, however, may provide for an electrical connectivity between the respective handle portions 24, 28 regardless of the coating 200a, 200b. For example, the first handle portion 24 may have the bolt 100 in contact therewith, such as at a contact portion or region 204. The bolt 110 may extend through the bore 154 and contact the conductive portion of the handle 24 of the conductive region or contact region 204. The bolt 110 may further extend through the bore 134 and the second handle portion 28 and contact the second handle portion 28 at a second conductive or contact region 208. Thus, a contact or conduit may be formed between the two handle portions 24, 28 by the two contact regions 204, 208. In various embodiments, therefore, electrical conductivity may be made by the connection 68 to the monitor system 70 through the first handle portion 28 through the contact region 208 through the bolt 110, through the first contact region 204, and to the first handle portion 24. Generally, a conductivity path is illustrated by the dashed line 212. As discussed above, the conductivity may allow a signal to pass in either direction, such as either from or to the tips 50, 54 to the monitor box 70. It is also understood, however, that the path along the handle portion 28 is maintained, thus the signal may also pass through the tip 54 and continue on path 212a. As illustrated in FIG. 1, and discussed above, the path 212, 212a may go from the controller 70,m through the instrument 20, through the patient 58, through the sensor 82, and to the controller 70. The path 212, 212a may be on only one direction for a monopolar instrument. The path 212, 212a however, may be reversed (i.e. signal initiated through the sensor 82 and sensed. received at the tips 50, 54) as noted above but only have a single direction in any particular use.

In addition to the contact points 204, 208 between the respective handles 24, 28 and the nut 110, the washers 118, 114 may also provide additional conductive paths. The washers 114, 118 may be formed of electrically conductive materials and/or be coated with electrically conductive materials (e.g. electrically conductive ceramic coating). As illustrated in FIG. 6, the washers 114, 118 may also directly contact the conductive portion of the respective handles 24, 28 and, also therefore, provide an addition electrical pathway between respective handles 24, 28. As discussed above a pathway 212 may be through or via the bolt 110, but the washers 114, 118, due to direct contact with the handles 24, 28 and with each other (e.g. as illustrated in FIG. 6) may be provided a second electrical contact or pathway as illustrated by the dash line 220. Again, the pathway 220 may be bi-directional between the respective tips 50, 54 and the connection 68. The washers 114, 118 may also assist in precise and non-binding movement of the handles 24, 28 relative to one another during operation of the instrument 20.

Figure 7A:
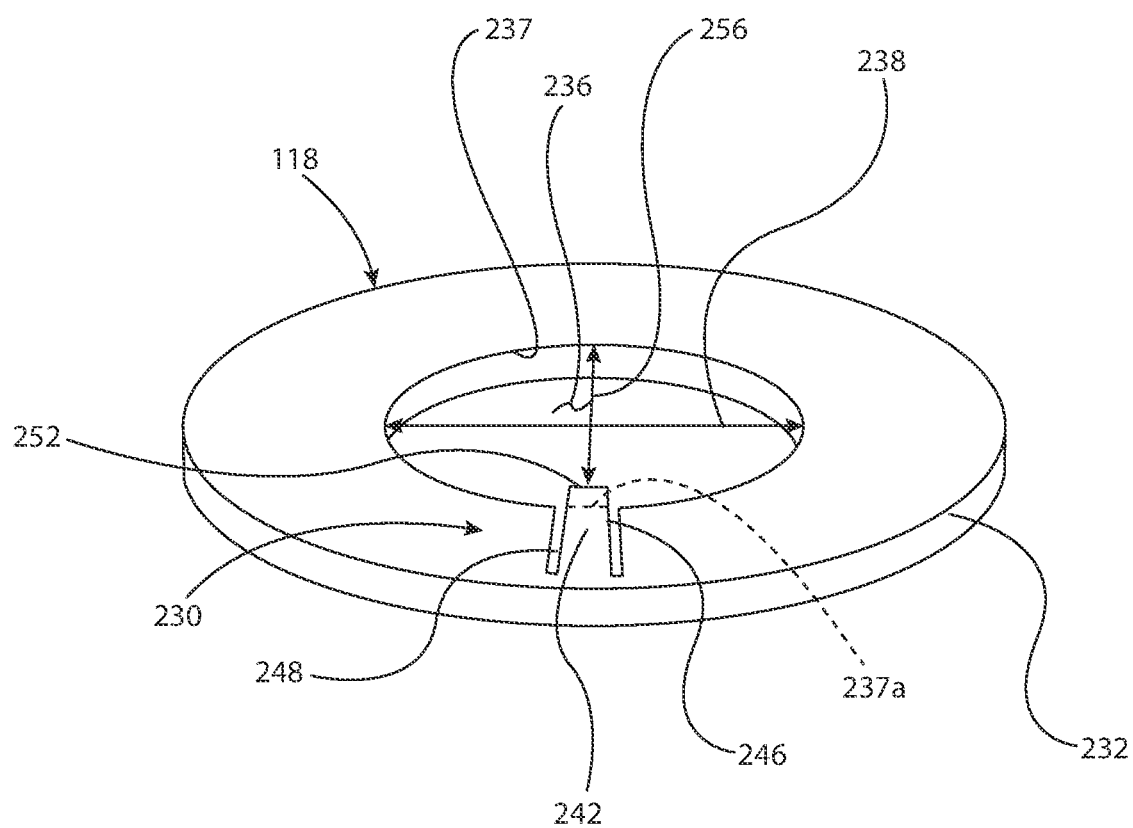
FIG. 7A is a detail view of a washer of the hinge assembly of FIG. 7.

With additional reference to FIG. 7, the washers 114, 118, for example including the washer 118, may include an additional contact or connection portion. For example, as illustrated in FIG. 7 and additionally in FIG. 7A, the washer 118 may include a connection or bias portion 230. The washer 118 may include an external diameter or surface 232 that may contact the handle 24, as illustrated in FIG. 6. The washer 118 may also include a bore 236 defined by an internal wall 237 at forms or defines an arc or circle 237a and may include a first diameter or dimension 238. The first dimension 238 may include an internal diameter that is similar to an external diameter of the bolt 110 at the region 142. Therefore, the bolt 110 may pass through and/or be press fit into the bore 236. The bias region 230, however, may include a bias portion or spring, such as a finger hat may be separated from the washer 118 by a first cut or depression 246 and the second cut 248. Thus, the bias portion 242 may extend further than the circle 237a and move relative to the internal wall 237 that forms or defines the bore 236.

The finger 242 and the spring or contact region 230, therefore, may extend into the bore 236 a distance greater than the arc 237a and/or the adjacent or nearby wall 237. For example, the finger 242 may include an end or contact portion 252 that has a dimension 256 from the opposed wall portion 237 to define a diameter 256 that is less than the diameter 238. When fitted onto the bolt 142, as illustrated in FIG. 7, the finger 242 may have the contact region 252 in contact with the bolt 110. The finger portion 242 may be biased against the bolt 110. Therefore, an additional bias contact of the washer 118 may be maintained with the bolt 110. With reference to FIG. 7, therefore, a connective path may be made through the washer 118 and the bolt 110 such as the path illustrated by the path 270 in dashed line. Thus the bias portion 230 may assist in maintain or ensuring and maintain contact with the washer 118 to assist in maintaining the electrical conductivity between the two handles 24, 28.

Figure 8:
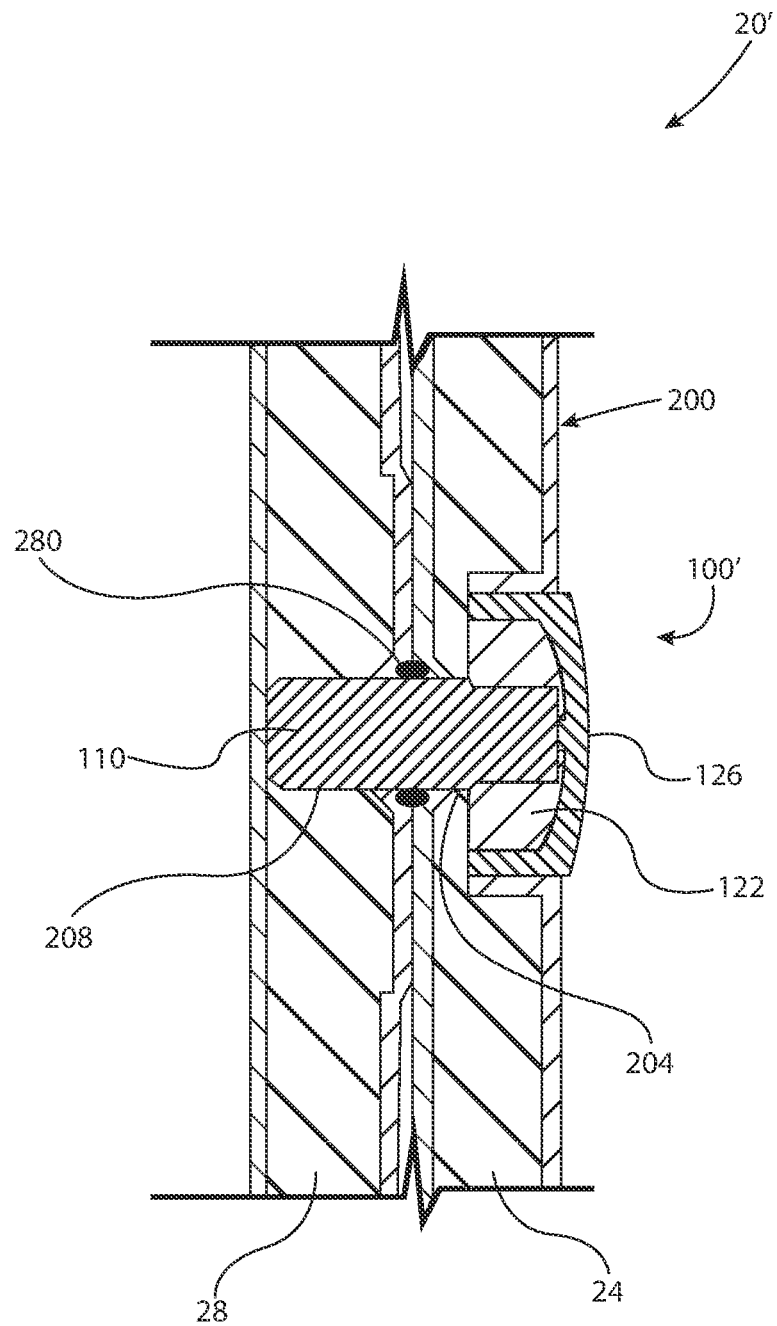
FIG. 8 is a cross-sectional view similar to that of FIG. 6 of a hinge assembly, according to various embodiments.

Turning reference to FIG. 8, a hinge assembly 100' is illustrated. The hinge assembly 100' may include portions similar to those discussed above and include similar or identical other signals. For example, the hinge assembly 100' may interconnect the two handle portion 24, 28. The handle portion 24 and the handle portion 28 may be coated with a respective coating 200, as discussed above. Further the hinge assembly 100' may include the bolt 110 and the nut 122 and the cap 126. Again the electrical connectivity between the two handles 24, 28 may be made via the bolt 110 that is in contact at the respective contact regions 204, 208, similar to that discussed above. The hinge assembly 100', however, may not include or require the two washers 114, 118. Nevertheless, the hinge assembly 100' may include a further sealing or bearing member, such as an O-ring or O-bearing 280. The bearing 280 may surround the bolt 110 and provide an insulation relative to the bolt 110 in the assembled form, as illustrated in FIG. 8. Accordingly, the hinge assembly 100' may be used in addition and/or alternatively to the hinge assembly 100, as discussed above. It is understood that various portions may be substituted and/or combined, as is understood by one skilled in the art.

Figure 3A:
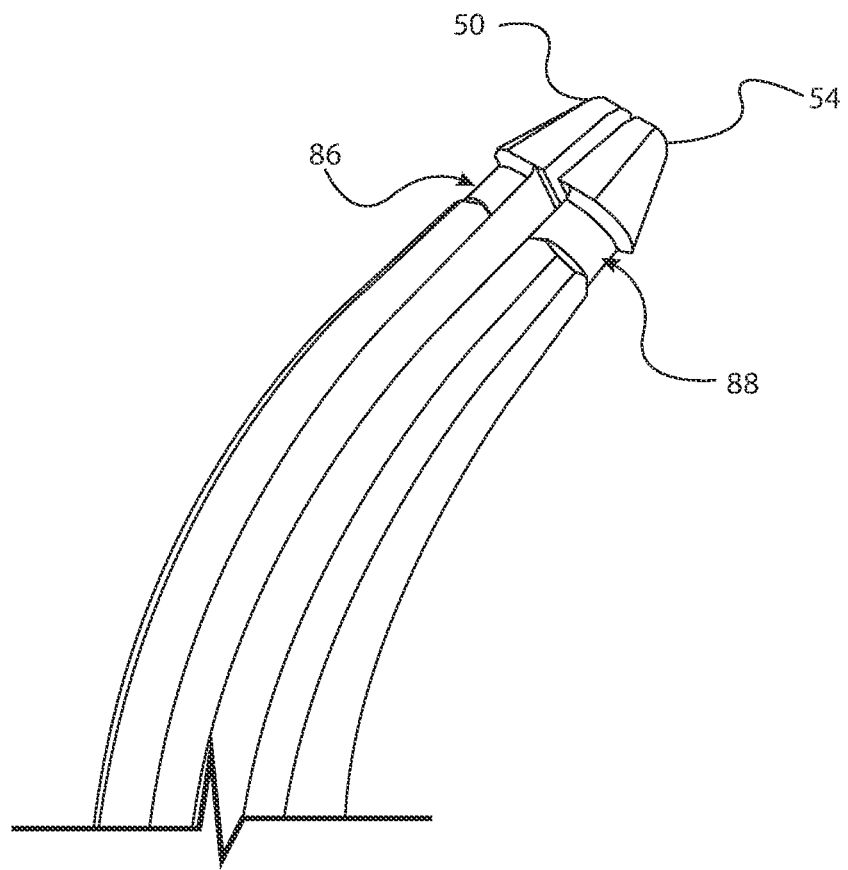
FIG. 3A is a detail view of an uncoated tip taken in circle 3A of FIG. 3.
Figure 9:
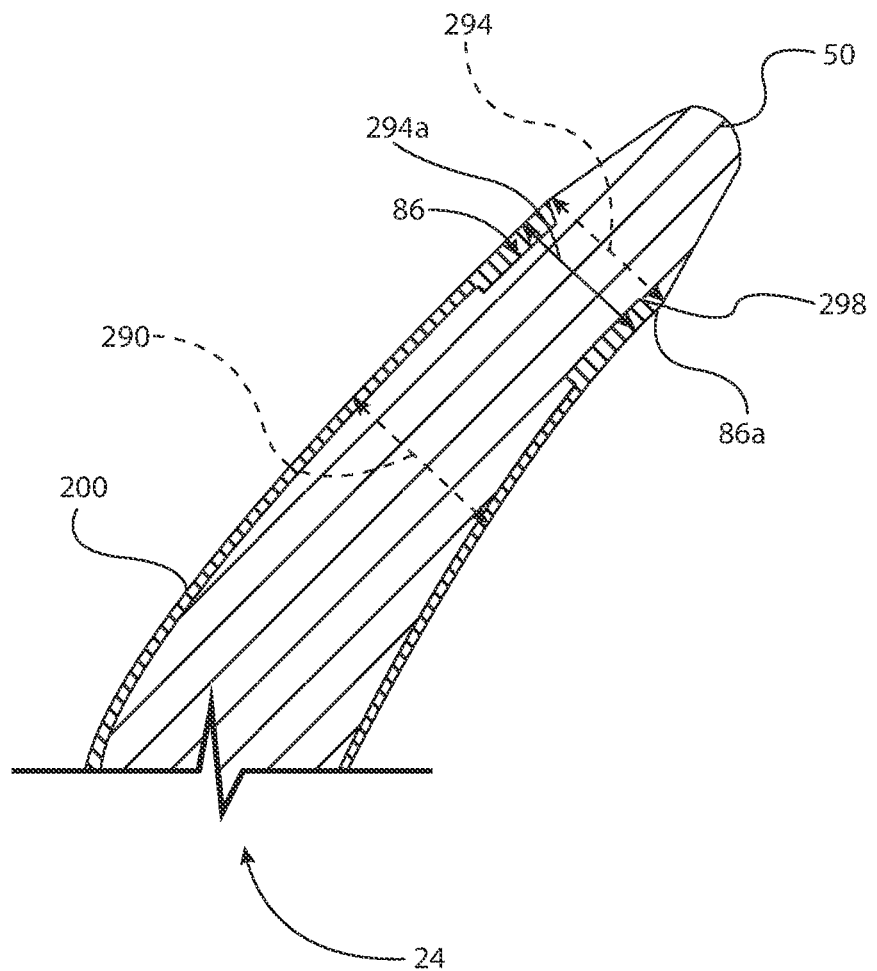
FIG. 9 is a detail view of a distal end of the instrument assembly taken along line 9-9 of FIG. 3 with a coating thereon, according to various embodiments.

As discussed and illustrated above, the instrument 20 may include the coating 200, in various embodiments. With reference to FIG. 9 and returning reference to FIG. 6 and FIG. 3A, the handle portions 24, 28 include the coating 200 thereon. As illustrated in FIG. 9, the tip 50 is illustrated as uncoated. It is understood that the second tip 54 may also be uncoated and that the second handle 28 may include a similar instruction, and therefore discussion of the construction of the handle 24 is merely exemplary. Accordingly, discussion herein of the handle portion 24 and the tip 50 is understood to relate to both of the handle portions.

The end or stop 86 may be formed as a depression or groove around the handle portion 24. The coating 200 may then be formed onto the handle portion 24 to allow for the tip 50 to remain exposed while covering the remaining portion of the handle portion 24. The coating may engage or extend to a wall 86*a* such that the coating 200 has an external dimension 290 that is substantially similar to an external dimension 294 at the wall 86*a*. The coating 290 has a similar external dimension 294*a* similar or identical to the external dimension 294 of the tip 50, 54. Thus, the coating 200 may allow for a smooth or non-stepped transition between the coating 200 and tip 50 at a transition area 298. Thus, the tips 50, 54 may be substantially uncoated and the coating 200 need not cause a snag or obstruction to operation of the instrument 20 even due to a coating 200. It is further understood that the instrument 20 may include the depressions or groove to assist in ease of use of the tips 50, 54 for various purposes, such as dissection, without causing interaction with tissue or other portions with the transition region 298 of the instrument 20.

In various embodiments, the respective handle portions 24, 28 may be selectively and separately coated, such as with spraying, dipping, deposition, heat shrink, or the like. In other words, prior to assembly both of the handles 24, 28 may be coated according to an appropriate process. In various embodiments, for example, portions of the hinge region 44 may be masked to allow for conductivity when the hinge assembly 100 is placed and the handles 24, 28 are assembled with the hinge assembly 100. Thus, the handle 24, 28 may be coated prior to assembly.

For and during the coating, the end or stops 86, 88 may assist in ensuring positioning of the coating relative to the tips 50, 54 without interfering with future use of the instrument 20. Further the respective hinge assemblies 100, 100', which may be used alternatively and/or in combination, may assist in ensuring a monopolar conductivity between the connection 68 and the tips 50, 54. The hinge assembly, as discussed herein, may assist in ensuring that the instrument 24 is substantially a mono-polar instrument such that both tips 50, 54 are connected to the connection 68 electrically, as discussed above.

In various embodiments, the instrument 20 may further include a single signal current connection, but with two connectors thus the connector 68 and a second connector 68', as illustrated in FIG. 1. The two connectors 68, 68' may connect to a single conductor from the controller 70, but have a split or Y-connection 66' to the two connectors 68, 68'. The signal, therefore, may be the same signal 270 through the instrument 20 and may include a signal portion 270*b* form the second connector 68'. Thus, the two connectors 68, 68' may provide the same signal to the two tips 50, 54 through the handles separately and/or the hinge assembly 100.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for monopolar nerve monitoring, comprising:
 a first handle member having a first side and a second side extending from a first end to a second end;
 a second handle member having a third side and a fourth side extending from a third end to a fourth end;
 a single signal connection formed with the first handle member;
 a hinge region defined by the first side of the first handle member positioned near and facing the third side of the second handle member, wherein the opposite second sides and fourth sides are exposed and facing away from the hinge region and each other;
 a hinge assembly extending between the first handle member and the second handle member in the hinge region, including:
  an elongated member positioned in a first bore of the first handle member in the hinge region and a second bore in the second handle member in the hinge region, wherein the elongated member is configured to allow movement of the first handle member relative to the second handle member,
  a first washer in electrical contact with the elongated member and at least one of the first handle member and the second handle member, the first washer including a bore defined by an inner wall, the inner wall configured to engage and bias the elongated member upon engagement thereof, and a biasing member including first and second radial cuts defined in the first washer forming a finger spring separated from the first washer, the finger spring moveable to bias against the elongated member upon engagement thereof, the finger spring extending inwardly past the inner wall into the bore; and an electrically insulating material coating the first handle member and the second handle member from the first end and third end to the respective second end and fourth end;

wherein the hinge mechanism forms an electrical connection between the single connection and both the second end and the fourth end such that a first distal tip at the second end and a second distal tip at the fourth end are both electrically connected to the single signal connection, and wherein the finger spring is moveable during the movement of the elongated member upon actuation of the first and second handles to provide and maintain an additional biasing contact with the elongated member to ensure electrical continuity.

2. The system of claim 1, wherein the finger spring is formed as a single member with the first washer.

3. A system for monopolar nerve monitoring, comprising:
a first handle member having a first side and a second side extending from a first end to a second end;
a second handle member having a third side and a fourth side extending from a third end to a fourth end;
a single connection formed with the first handle member;
a hinge region defined by the first side of the first handle member positioned near third side of the second handle member;
a hinge mechanism extending between the first handle member and the second handle member;
an elongated member positioned in a first bore defined in the hinge region of the first handle member and a second bore defined in the hinge region of the second handle;
a first washer in electrical contact with the elongated member and at least one of the first handle member and the second handle member, the first washer including a bore defined by an inner wall, the inner wall configured to engage and bias the elongated member upon engagement thereof, and
a biasing member including first and second radial cuts defined in the first washer forming a finger spring separated from the first washer, the finger spring moveable to bias against the elongated member upon engagement thereof, the finger spring extending inwardly past the inner wall into the bore; and
wherein the second side of the first handle member and the fourth side of the second handle member are substantially exposed relative to the hinge region;
wherein the hinge mechanism forms an electrical connection between the single connection and both the second end and the fourth end; and
wherein the finger spring is moveable during the movement of the elongated member upon actuation of the first and second handles to provide and maintain an additional biasing contact with the elongated member to ensure electrical continuity.

4. The system of claim 3, wherein the hinge mechanism provides the only electrical connection between the single connection and both the second end and the fourth end.

5. The system of claim 3, further comprising:
an electrically insulating material coating the first handle member and the second handle member from the first end and third end to the respective second end and fourth end.

6. The system of claim 5, further comprising:
a first graspable portion formed at the first end and a second graspable portion formed at the third end;
wherein the electrically insulating material coating coats the first graspable portion and the second graspable portion;
wherein a first tip at the second end and a second tip at the second end are exposed from the electrically insulating material coating.

7. The system of claim 6, wherein the first tip and the second tip are monopolar.

8. The system of claim 3, wherein the first washer comprises:
wherein the internal bore includes a first internal dimension between first and second opposed portions of the internal wall and a second internal dimension between an end of the biasing member and a third opposed portion of the internal wall;
wherein the second internal dimension is less than the first internal dimension.

9. The system of claim 8, wherein the finger spring is formed as a single member with the first washer.

10. The system of claim 3, further comprising:
a second washer in electrical contact with the first washer, the elongated member, and the other of at least one of the first handle member and the second handle member.

11. A method of monopolar nerve monitoring with a hinged instrument having a first handle member and a second handle member, comprising:
providing a first handle member having an electrically insulating coating extending from a first end toward a second end, wherein a first tip at the second end is exposed;
providing a second handle member having an electrically insulating coating extending from a third end toward a fourth end, wherein a second tip at the fourth end is exposed;
providing a single electrical connection at the first end or the third end; and forming an electrical path between the first handle member and the second handle member at a hinge region between the first handle member and the second handle member;
connecting the first handle member and the second handle member with an elongated member; and
positioning a first washer in contact with the elongated member and at least one of the first handle member or the second handle member, the first washer including a bore defined by an inner wall, the inner wall configured to engage and bias the elongated member upon engagement thereof; and
providing a biasing member including first and second radial cuts defined in the first washer forming a finger spring separated from the first washer, the finger spring moveable to bias against the elongated member upon engagement thereof, the finger spring moveable during the movement of the elongated member upon actuation of the first and second handles to provide and maintain an additional biasing contact with the elongated member to ensure electrical continuity, the finger spring extending inwardly past the inner wall into the bore.

12. The method of claim 11, further comprising:
hingedly connecting the provided first handle member and the provided second handle member to hingedly move relative to one another.

13. The method of claim 11, further comprising:
forming a first portion of the first handle member to have a first external dimension less than a second external dimension of the first tip;
providing the coating on the first portion to have a third external dimension equivalent to the second external dimension of the first tip;
forming a second portion of the second handle member to have a fourth external dimension less than a fifth external dimension of the second tip; and
providing the coating on the second portion to have a sixth external dimension equivalent to the fifth external dimension of the second tip.

\* \* \* \* \*